Patented Oct. 9, 1951

2,570,231

UNITED STATES PATENT OFFICE 2,570,231

CONDENSED MILK COMPOSITION AND ITS PREPARATION

Francis Frederick Hansen, Pittsburgh, Pa.

No Drawing. Application January 4, 1946, Serial No. 639,151

8 Claims. (Cl. 99—55)

This invention relates to sweetened condensed milk, and is for an improved condensed milk composition and the preparation thereof. While intended primarily as an improved composition for use in commercial bakeries, the invention is applicable to other purposes.

It is well known that the baking industry employs very large quantities of milk in various different grades and forms in the production of baked food products. Thus, there are consumed in the baking industry great quantities of sweetened condensed skim milk. Sweetened condensed skim milk contains approximately twenty-eight per cent milk solids, forty-two percent sugar, and thirty per cent water. The sugar may be all sucrose, or part sucrose and part dextrose.

Considerable difficulty is encountered in the production of this sweetened skim milk from the standpoint of heat coagulation during condensing and subsequent thickening in storage. The baking industry prefers a heavy viscous body that will flow out of a barrel bung attachment about three inches in diameter. Many sweetened condensed skim milks in storage after manufacture thicken with age to such a degree that they will not flow out of the barrel bung, necessitating the barrel head removal and the contents being scooped out. Part or all of the sugar settles to the bottom, causing great non-uniformity in the product. Much research has proven that mineral salt balance in these milks have much to do with this problem of thickening and excess coagulation. The mineral content of milks contain positive ions like calcium, magnesium, potassium, and the like and negative ions like phosphates and citrates.

In order to reduce thickening and coagulation during condensing and storage following manufacture, it is customary to add sodium bicarbonate, di-sodium phosphate, or sodium citrate, and much has been accomplished from such practice. Undoubtedly the effect of mineral salt balance on heat stability or coagulation tendencies during condensing and thickening with age in storage after the manufacture varies with many other factors present in condensing milks, such as acid reaction of proteins, albumins, and the like, fermentation products apart from acids, or other complex balances ever present in the colloidal system of milks. In many cases, pilot plants are employed to run preliminary tests on lots of milk to determine its mineral salt balance, the amount of sodium bicarbonate to add, the optimum forewarming temperatures and best final condensing temperatures in order to reduce to a minimum the coagulation problems during condensing and the subsequent thickening problem during storage.

In accordance with the present invention, instead of using sodium citrate, di-sodium phosphate or sodium bicarbonate as a means to correct the salt balance and raise the heat coagulation point in sweetened condensed skim milk manufacture, it is found that equally good results are obtained by the use of stabilized calcium acid lactate or calcium lacto-phosphate as a corrective to produce optimum calcium-casein balance for maximum casein stability. Also, the use of these calcium compounds imparts additional desirable properties to the milk that are not obtainable by the use of sodium citrate, di-sodium phosphate, or sodium bicarbonate. The calcium acid lactate or calcium lacto-phosphate is employed from substantially one per cent to substantially five per cent based on non-fat milk solids in the sweetened condensed skim milk as a finished product.

In addition to the elimination of thickening and coagulation of the milk during condensing and storage following manufacture, the calcium acid lactate or calcium lacto-phosphate inhibit deterioration of the milk due to oxidation, with attendant inhibition of rancidification of the milk.

Calcium acid lactate and calcium lacto-phosphate also contribute a valuable action through the acid content which they possess. It is well known in the baking industry that best bakery products are produced when the dough mass has a pH value of from 5 to 5.25. Freshly milled flour has a pH value of from 6 to 6.5, depending upon the age of the wheat from which the flour was milled. To obtain optimum baking results, therefore, the lower pH value desired must be obtained through fermentation. This fermenation produces carbonic acid gas, lactic acid, and acetic acid, but the fermentation requires considerable time and elevated temperatures which contribute to the loss of many desirable fermentation flavors. The use of the calcium acid lactate or calcium lacto-phosphate contributes valuable action to the production of a proper pH value for best results in the dough mass.

In the use of these salts, it is possible to use a vigorous fermentation and at the same time preserve the full flavor. By carrying on a sufficiently vigorous fermentation in the ordinary manner to obtain optimum pH values, there is likelihood of destroying the delicate flavors of fermentation that are desired in the finished product. Bread or rolls made from a young fermentation having a higher pH value have the most desirable flavor, but they are offset by the lack of keeping properties of the finished product and the usual small volume attendant to such a process. Therefore, in normal practice the baking industry sacrifices flavor in order to obtain larger volume and longer keeping properties in the finished goods.

However, with the use of calcium acid lactate or calcium lacto-phosphate as conditioning agents for the sweetened condensed skim milk, it is possible to use a vigorous fermentation without any sacrifice of full flavor. It is very difficult without the use of these salts to ferment the doughs to a pH value of 5, and at the same time retain an acceptable flavor in the finished product; but this can be attained readily by the use of these compounds.

It may be mentioned, also, that since calcium acid lactate and calcium lacto-phosphate are so water-soluble, they increase the viscosity of the dough; this increase in viscosity causes a need for more water in the dough for proper consistency. This increases the yield of baked goods, and longer freshness of such baked goods since higher moisture content prolongs freshness. These soluble calcium salts also are natural yeast foods, and therefore contribute valuable aid in yeast action in the dough because their water-soluble calcium ions are universally recognized as yeast stimulants or yeast foods.

The calcium acid lactate employed is in stabilized form, and is obtained by partially neutralizing lactic acid with a suitable neutralizing calcium compound, such as calcium carbonate or calcium hydroxide in the presence of a stabilizing agent such as starch and calcium sulphate. In view of the fact that it is extremely difficult to obtain one hundred per cent lactic acid, it is preferred to use either eighty-five per cent lactic acid, or a fifty per cent lactic acid, such concentrations being readily obtainable on the market in edible purities. However, in practice, it is preferred to employ the fifty per cent concentration of lactic acid, three hundred parts by weight of the lactic acid of edible purity being reacted with one hundred parts by weight of pure edible calcium carbonate.

That is to say, nine mols of pure lactic acid are reacted with three mols of pure calcium carbonate. Thus, for example, 1642 grams of fifty per cent edible lactic acid are reacted with 302 grams of pure calcium carbonate in the presence of 415 grams of corn starch and 450 grams of calcium sulphate. There results from the reaction 2026 grams of stabilized calcium acid lactate, when dehydrated and finely ground to two hundred mesh. The 2026 grams of stabilized calcium acid lactate is composed of 931 grams of calcium acid lactate plus 865 grams of filler (415 grams of starch and 450 grams of calcium sulphate) plus 230 grams of bound (chemically combined) water. This water is not removed by dehydration, but remains in the product as bound, or chemically combined, water. These proportional parts are based on pure lactic acid and pure calcium carbonate. Since there are no commercially pure lactic acids, a larger proportion of weaker lactic acids must be used based on the percentage of purity. The calcium carbonate and lactic acid are mixed with heat and stirring, carbon dioxide and water being produced in the reaction.

The reaction product of lactic acid and calcium carbonate normally is very unstable and highly hygroscopic in character, but a stable product may be obtained by adding calcium sulphate and starch to the reacting mixture of lactic acid and calcium carbonate, the calcium sulphate and starch being added directly into the reacting mass, while continuing the stirring. The resulting mass of material then is dehydrated either in the open or under vacuum until it contains less than three per cent of moisture. The material then is suitably comminuted in a hammer mill, or otherwise, to a fineness of 200-mesh, or finer. The resulting finely comminuted material is fluffy in character, and has a high bulk factor.

The "calcium lacto-phosphate," which may also be added to the liquid skim milk for the obtaining of the above-described desirable properties, is not a definite chemical compound, but actually is a mixture of mono-calcium acid phosphate and the reaction product of the neutralization of lactic acid with neutralizing calcium compounds such as calcium carbonate or calcium hydroxide. This neutralization product is, as has been set forth above, substantially equal molecular parts of normal calcium lactate and calcium acid lactate. To this reaction mixture there are added from three to five per cent of mono-calcium acid phosphate. The resulting material is dried and comminuted to 200-mesh or finer, and the resulting calcium lacto-phosphate is fluffy in character and has a high bulk factor.

The preparation of calcium acid lactate and calcium lacto-phosphate is described in my Patent No. 2,557,283, issued June 19, 1951, and my copending application Serial No. 599,119, filed June 12, 1945, respectively.

In accordance with the present invention, there are incorporated from approximately one per cent to approximately five per cent of the stabilized calcium acid lactate or calcium lacto-phosphate into the sweetened condensed skim milk, the percentage being by weight and being the amount of actual calcium acid lactate or calcium lacto-phosphate incorporated in the said milk, exclusive of fillers and drying agents. The prescribed percentages of these materials are added to the sweetened condensed skim milk, stirring vigorously for several minutes, and then running the mixture through homogenizers or colloidal mills for complete distribution of all ingredients. The calcium lacto-phosphate employed for the purposes of the present invention is the same as described in National Formulary No. 5, and is totally water-soluble. Likewise, the stabilized calcium acid lactate itself is edible grade and is completely water-soluble.

While the preferred use of the calcium acid lactate or calcium lacto-phosphate in accordance with the present invention is to use either one or the other of these compounds, it will be understood that they may be used conjointly. When either of these salts is employed, it is found in practice that the optimum percentage is substantially three per cent, this being the percentage of the actual compound without filler or drying agent. When these calcium compounds are used conjointly, it is preferred to use them together in amounts which will total substantially three per cent.

I claim:

1. A composition of matter comprising sweetened condensed skim milk containing a minor amount of an edible calcium salt, calcium acid lactate, said calcium salt being effective for inhibiting heat coagulation of the milk or thickening of the milk in storage.

2. A composition of matter comprising sweetened condensed skim milk containing a minor amount of an edible calcium salt compound, calcium lacto-phosphate, said salt being effective for inhibiting heat coagulation of the milk or thickening of the milk in storage.

3. The composition defined in claim 1 in which one per cent to five per cent of the salt is incorporated in the mixture based upon the weight of the sweetened condensed skim milk.

4. The composition defined in claim 1 in which approximately three per cent of a stabilized calcium acid lactate based on the weight of the sweetened condensed skim milk is used in the mixture.

5. A process of preparing sweetened condensed skim milk, comprising adding to a solution of the milk a minor portion of a dried powder, edible calcium salt, calcium acid lactate, actively stirring the mixture to distribute the salt through the mixture and homogenizing the mixture to obtain a complete distribution of the constituents throughout the mixture.

6. The process defined in claim 5 in which one per cent to five per cent of the acid lactate based on the weight of the milk is mixed with the milk.

7. The process defined in claim 5 in which approximately three per cent of the stabilized calcium acid lactate based on the weight of the condensed milk is mixed with the milk for stabilization of the mixture.

8. A process of preparing sweetened condensed skim milk comprising adding to the solution of the milk a minor portion of a dried powder edible calcium salt calcium lacto-phosphate, actively stirring the mixture to distribute the salt in the mixture and homogenizing the mixture to obtain a complete distribution of the constituents throughout the mixture.

FRANCIS FREDERICK HANSEN.

REFERENCES CITED

The following references are of record in the file of this patent:

UNITED STATES PATENTS

| Number | Name | Date |
|---|---|---|
| 1,190,827 | Wahl | July 11, 1916 |
| 1,302,486 | Dunham | Apr. 29, 1919 |
| 1,341,040 | Bosworth | May 25, 1920 |
| 1,500,545 | Buffington | July 8, 1924 |
| 1,803,588 | Blank et al. | May 5, 1931 |
| 1,887,175 | Woxvold | Nov. 8, 1932 |
| 2,071,367 | Weisberg et al. | Feb. 23, 1937 |
| 2,193,950 | Turnbow | Mar. 19, 1940 |
| 2,426,736 | Hutchinson | Sept. 2, 1947 |

FOREIGN PATENTS

| Number | Country | Date |
|---|---|---|
| 22,968 | Great Britain | Sept. 12, 1896 |